United States Patent

Lahtinen

[19]

[11] Patent Number: 6,157,832
[45] Date of Patent: Dec. 5, 2000

[54] SERVICE-DEPENDENT ROUTING OF A MOBILE-TERMINATING CALL IN A MOBILE COMMUNICATION SYSTEM

[75] Inventor: Lauri Lahtinen, Espoo, Finland

[73] Assignee: Nokia Telecommunications OY, Espoo, Finland

[21] Appl. No.: 09/068,269

[22] PCT Filed: Nov. 5, 1996

[86] PCT No.: PCT/FI96/00596

§ 371 Date: Oct. 1, 1998

§ 102(e) Date: Oct. 1, 1998

[87] PCT Pub. No.: WO97/17816

PCT Pub. Date: May 15, 1997

[30] Foreign Application Priority Data

Nov. 6, 1995 [FI] Finland ..................... 955331

[51] Int. Cl.[7] .................................................. H04Q 7/20
[52] U.S. Cl. ..................... 455/433; 455/438; 455/445
[58] Field of Search .......................... 455/433, 432, 455/445, 438, 560

[56] References Cited

FOREIGN PATENT DOCUMENTS 0 614 322 A1  9/1994  European Pat. Off. .

WO 94/21090  9/1994  WIPO .

OTHER PUBLICATIONS

A copy of the International Search Report.

*Primary Examiner*—Daniel S. Hunter
*Assistant Examiner*—Thuan T. Nguyen
*Attorney, Agent, or Firm*—Altera Law Group, LLC

[57] ABSTRACT

The present invention relates to service-dependent routing of a mobile-terminating call in a mobile communication system employing a multinumbering scheme. A visitor location register (VLR), as a response to a roaming number request from a home location register (HLR), allocates a roaming number to the call and the roaming number is returned to the HLR and further to a routing exchange (GMSC, EXC) to be used for routing the call to the mobile switching centre (MSC) associated with the VLR. In some cases there may be two different alternative transmission routes between the routing exchange (GMSC) and the MSC. In order to enable the routing exchange to select the appropriate one of these transmission routes for routing the call to the MSC, the roaming number (MSRN) allocated by the VLR contains a part (SERVN) which is dependent on the service required by the call and indicates the appropriate one of the transmission routes (ROUTE_1, ROUTE_2).

12 Claims, 3 Drawing Sheets

SERVICE-DEPENDENT ROUTING OF A MOBILE-TERMINATING CALL IN A MOBILE COMMUNICATION SYSTEM

FIELD OF THE INVENTION

The present invention relates to mobile communication systems, and especially to routing of a mobile-terminating call in mobile communication systems employing a so-called multinumbering scheme.

BACKGROUND OF THE INVENTION

In addition to conventional data transmission, modern mobile communication systems provide subscribers with various data transmission features. Mobile communication system services can be generally divided into Teleservices and Bearer Services. A bearer service is a telecommunication service that allows transmission of signals between user-network interfaces. For example, modem services are bearer services. In a teleservice the network also provides terminal equipment services. Speech services, telefax services and videotex services are major teleservices.

One mobile subscriber may typically have a right to various teleservices and network services which are here generally referred to as basic services. The subscriber may have access to a speech, telefax and data service. A mobile-terminating or mobile-originating call can thus require any of these basic services, wherefore the appropriate service should be indicated to the mobile network. For example, in a pan-European mobile communication system GSM, call set-up signalling transmitted by a mobile station contains information on the required basic service in a Bearer Capability Information Element GSM BCIE. The mobile network can thus select the appropriate basic service for mobile-originating calls. Also, ISDN (Integrated Services Data Network) supports this type of signalling: calls from the ISDN to the mobile network contain a similar information element ISDN BCIE that indicates the service required. In that case the subscriber has only one directory number for all services and the services required by the call are identified on the basis of the ISDN BCIE. This is known as Single Numbering Scheme.

Unfortunately the public switched telephone network (PSTN) does not support signalling of service data. Therefore when a call originates from or is routed via the PSTN, the information on the service type of the call will not be transmitted to the mobile station network. In that case, the mobile network should be informed in some other way of the basic service required by the call.

A prior art solution to this problem is a Multinumbering Scheme in which the number of directory numbers of a mobile subscriber is equal to the number of the services to which he/she wishes to receive incoming calls. A directory number is also known as a Mobile Subscriber ISDN Number (MSISDN). A subscriber may have a directory number for a speech service, a telefax service and a modem service, for example. In the multinumbering scheme, a calling subscriber dials one of the directory numbers of the mobile subscriber according to the desired service. In the GSM network, subscriber services are defined in a subscriber's home location register HLR where other subscriber data is also stored permanently. Also, information on the association between the directory numbers and the services of the subscriber is stored in the HLR. Furthermore, a specific BCIE indicating the type of a call and the network resources required for the call is also linked with the directory number (MSIDSN) in the HLR. The BCIE is described e.g. in GSM Recommendation 04.08, version 4.5.0, pp. 423 to 431. The HLR also contains an IMSI (International Mobile Subscriber Identity) used within the GSM system. The mobile subscriber has only one IMSI which is common to all the basic services.

The GSM system also has another subscriber register, a visitor location register VLR, into which some of the subscriber data is copied from the HLR when the subscriber is located within the area of the VLR.

FIG. 2 illustrates a call set-up of a mobile-terminating call in a GSM type of mobile communication system using a multinumbering scheme. In step 1, a call addressed to one of the subscriber's directory numbers arrives at a network gateway mobile switching centre GMSC which sends a routing information inquiry (message 2) to the subscriber's HLR, which is determined by the subscriber's directory number MSISDN. The subscriber's MSISDN number (and possibly ISDN BCIE +HLC+LLC if signalling is supporting the transmission of this data) is also sent along with the routing information inquiry message 2. In connection with a location updating, the information on the VLR in whose area the subscriber is located has been updated to the subscriber's HLR. On the basis of that information, the HLR sends a roaming number request (message 3) to the VLR. In the roaming number request, the mobile subscriber's IMSI and the BCIE (or the ISDN BCIE received in message 2) related to the called MSISDN are sent to the VLR. The BCIE indicates e.g. the network resources required by the call, but not directly the type of the basic service. The VLR will store the received BCIE and allocate a roaming number MSRN (Mobile Station Roaming Number). The VLR will send the allocated roaming number to the HLR in a response message 5. The HLR, in turn, forwards the roaming number to the GMSC that has requested routing information, in a message 6. The routing number space is determined in such a manner that it will route the call every time to the mobile switching centre MSC whose VLR has allocated a roaming number. Thus the GMSC routes the call forwards by sending an initial address message 7 to the mobile switching centre MSC indicated by the roaming number. The MSC makes an inquiry to the VLR, messages 8 and 9, and initiates call set-up which is illustrated with arrows 10 and 11.

In some case there may be between GMSC and MSC different types of transmission links which can be selected for routing. Correspondingly, different services may have different transmission requirements, as a result of which all transmission links are not suitable for all services. In these cases, the GMSC or any intermediate exchange should be able to select the appropriate transmission link.

FIG. 3 illustrates this problem. There is one transmission route from the GMSC to a transit exchange EXC, and there is no need for any selection between the transmission links. There are two transmission routes from the EXC to the MSC: ROUTE__1 and ROUTE__2. Route 2 has transmission devices 31 and 32 that make route 2 unsuitable for some services. For some services, route 2 may, however, be the best alternative because of lower rates, for example. Route 1 may, in turn, have different transmission features. It is also possible that route 1 may handle the same services as route 2, but not vice versa.

When a call originates from a network where signalling supports the transfer of an ISDN BCIE, the GMSC, too, is informed of the service required by the calling subscriber. In that case it can select the appropriate transmission link or forward the information on the service to the transit exchange. But when the call is routed from the PSTN or via the PSTN, the GMSC is not informed of the required service. Then it is not able to select the appropriate transmission link or forward the service data to the GMSC.

SUMMARY OF THE INVENTION

An object of the present invention is to eliminate the above problem.

This is achieved with a visitor location register for a mobile communication system, the visitor location register being arranged to, as a response to a roaming number request received from a home location register, allocate a roaming number to a call terminating at a mobile station within an area of a mobile switching centre associated with the visitor location register, and to send the allocated roaming number via the home location register to a routing exchange to be used for routing the call to said mobile switching centre. The visitor location register is characterized in that the allocated roaming number contains a part which is dependent on the service required by the call and the value of which indicates of two or more different transmission routes the one via which the call is to be routed to said mobile switching centre.

The present invention also relates to a mobile communication system according to claim 4, which is characterized in that the allocated roaming number contains a part which is dependent on the service required by the call and indicates of two or more different transmission routes the one via which the call is to be routed from the GMSC to the MSC.

The present invention relates to a method according to claim 8 for routing a mobile-terminating call, which method is characterized by allocating a roaming number dependent on the service required by the call in the visitor location register, routing the call from the GMSC to the mobile switching centre via one of said alternative transmission routes selected according to the service-dependent roaming number.

In the invention information on the service required by the call is transmitted from the visitor location register to the routing exchange without changing the existing signalling protocol between the visitor location register and the home location register, or the home location register and the routing exchange. This is provided by service-dependent allocation of the roaming number: the roaming number allocated by the visitor location register to the calls contains information which identifies the transmission route of the call either directly as a routing address, or indirectly on the basis of the service or the type of transmission resource required by the call. The roaming number format is otherwise unchanged so that it can be transferred in existing signalling messages to the routing exchange. The routing exchange analyzes the roaming number and on the basis of the inventive information, selects a specific transmission link or the appropriate type of transmission link for routing the call.

BRIEF DESCRIPTION OF THE DRAWINGS

The invention will be explained in more detail by means of preferred embodiments with reference to the appended drawings, in which.

PREFERRED EMBODIMENTS OF THE DRAWINGS

The present invention is suitable for use in digital mobile communication systems. The invention is specifically suited for the pan-European digital mobile communication system GSM (Global System for Mobile Communications) and similar modern mobile communications systems, such as DCS1800 (Digital Communication System) and PCN (Personal Communication Network). In the following, the preferred embodiment of the invention will be disclosed in connection with the GSM system without restricting the invention thereto.

Figure 1:
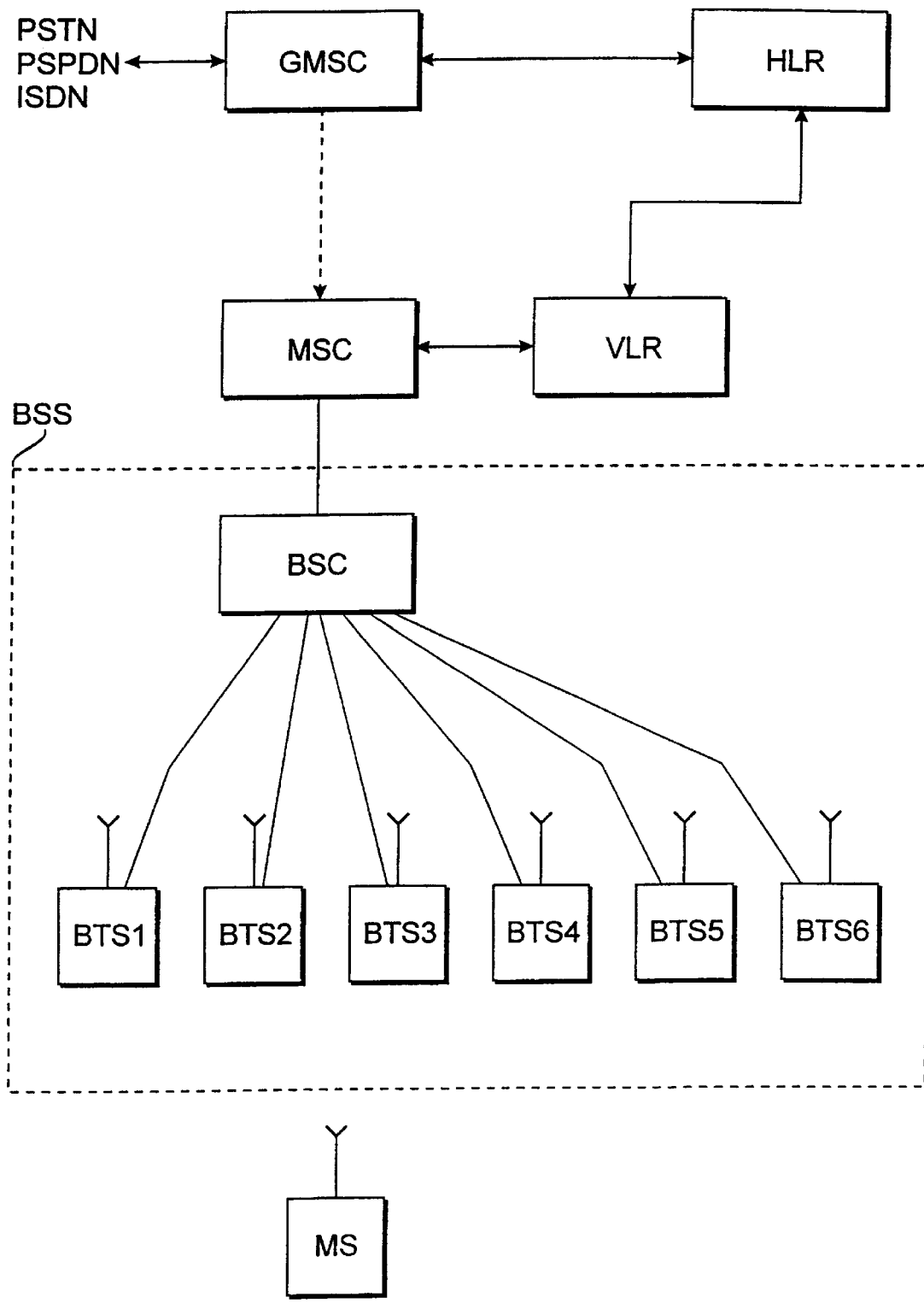
FIG. 1 shows a part of a mobile communication system.

FIG. 1 shows briefly the basic structure of the GSM system, without paying closer attention to its features or other aspects of the system. The GSM system is disclosed in more detail in the GSM Recommendations and in *The GSM System for Mobile Communications*, M. Mouly & M. Pautet, Palaiseau, France, 1992, ISBN:2-9507190-0-0-7, which are incorporated herein by reference.

The structure of the GSM system comprises two parts: a base station system BSS and a network subsystem (NSS). The BSS and mobile stations MS communicate over radio connections. In the base station system BSS, each cell is served by a base station BTS1 to BTS6. A set of base stations are connected to a base station controller BSC whose operation is to control the radio frequencies and the channels the BTS uses. The BSSs (more exactly the BSCs) are connected to a mobile switching centre MSC. Specific MSCs are connected to other telecommunication networks, such as a public switched telephone network PSTN, and comprise gateway functions for calls to and from this network. These MSCs are known as gateway MSCs (GMSC).

There are two main types of databases associated with call routing. A home location register HLR permanently or semi-permanently stores the subscriber data of all the subscribers of the network, including information on the services the subscriber may have access to, and on the subscriber's current location. The second register type is a visitor location register VLR. The VLR is usually associated with one MSC, but it may, however, serve several MSCs. It is common practice that the VLR is integrated into the MSC. The integrated network element is known as a visitor MSC (VMSC). Whenever the mobile station MS is active (registered and capable of making or receiving calls), the majority of the mobile subscriber data concerning the MS and stored in the HLR is copied to the VLR of the particular MSC in whose service area the MS is located.

As was explained above, modern mobile communication systems support a variety of teleservices and network services. The network services of the GSM system are specified in Recommendation GSM 02.02 version 4.2.0 and the teleservices in Recommendation GSM 02.03.

One mobile subscriber may have a right to different teleservices and network services which are here generally referred to as basic services. As was explained above, it is then advantageous to use a multinumbering scheme where a dedicated directory number MSISDN is assigned to each basic service.

In the GSM system subscriber services are determined in a subscriber's home location register HLR in connection with the other subscriber data. Each subscriber has a specific IMSI (International Mobile Subscriber Identity) which is used as a subscriber identity within the mobile network. The services defined for a subscriber are linked to the subscriber's IMSI. In accordance with the principle of the multi-numbering scheme, a dedicated directory number MSISDN-1 . . . MSISDN-n is assigned to each service 1 . . . n of the subscriber. The value of the BCIE (Bearer Capability Information Element), that is, information on network requirements of the service) is linked to each MSISDN number. The GSM BCIE is an information element where information on all the network requirements associated with the call, such as transmission rates, the number of data and stop bits, etc., are transmitted in the GSM system. The BCIE is described e.g. in GSM Recommendation 04.08, version 4.5.0, pp. 423 to 431.

In the future, it is possible to use in the GSM network in addition to the GSM BCIE described above an ISDN BCIE which is defined in Recommendation ETS 300102-1/Q.931 (Bearer Capability IE). Call type information is not directly included in this information element, wherefore information elements High Layer Compatibility (HLC) or Low Layer Compatibility (LLC) defined in Recommendations ETS 300102-1/Q.931 HLC and ETS 300102-1/Q.931 LLC are used along with it. The ISDN BCIE (and HLC and/or LLC) can be transmitted to the mobile switching centre from the fixed network along with a call set-up message.

In the current GSM system, a list of subscriber services is transferred along with other subscriber data from the VLR to the HLR in connection with a location updating, for example.

Figure 2:
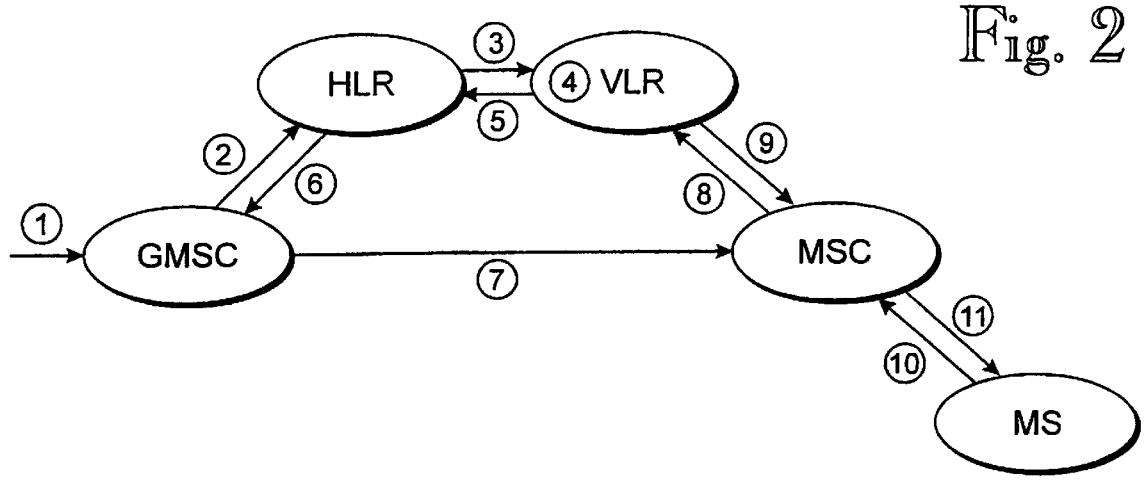
FIG. 2 illustrates routing of a terminating call in the mobile communication system of FIG. 1.

As was described with reference to FIG. 2, a subscriber's IMSI and a call-specific BCIE are transmitted in the roaming number request from the HLR to the VLR (cf. FIG. 2, message 3). In the conventional GSM system, the VLR assigns to a call a free roaming number MSRN which is then linked temporarily to said IMSI. Furthermore, the BCIE is transformed into service numbers that are stored together with the IMSI and the MSRN. The MSRN is sent in a response message to the HLR and further to the GMSC. When the call is routed to the MSC, the MSC makes a subscriber data inquiry by using the roaming number MSRN and receives the IMSI and the service number in the response. The MSC transforms the service number into a BCIE and allocates the required network resources for the radio path. No information on the service or the network resources required by the call are included in the roaming number MSRN or other signalling transmitted from the VLR to the HLR and from the HLR to the GMSC.

Figure 4:
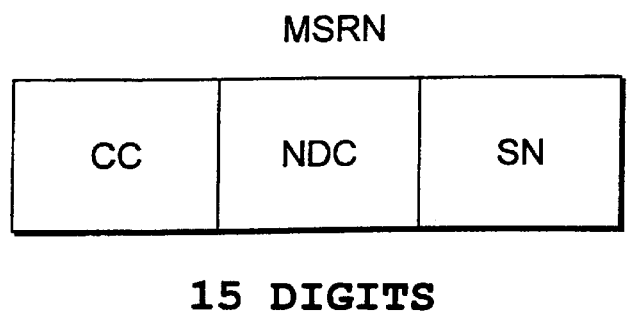
FIG. 4 shows a roaming number structure according to prior art.

FIG. 4 describes the MSRN number structure according to prior art in compliance with CCITT Recommendation E.164. The MSRN comprises a country code CC, a national destination code NDC (national routing address VLRN of the VLR and the MSC) and a temporary subscriber number SN.

Figure 5:
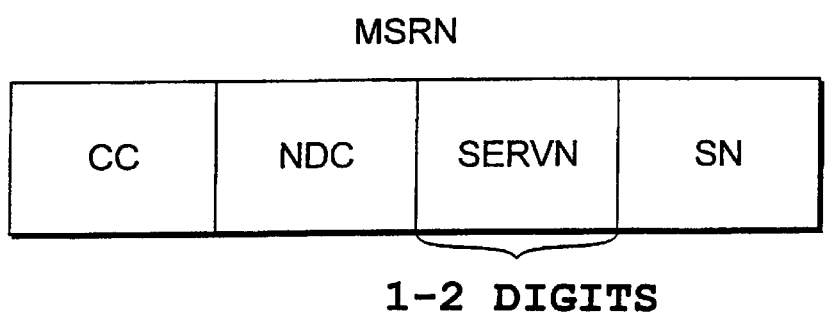
FIG. 5 shows a roaming number format containing service information according to the invention.

In the invention, the allocation of the roaming number MSRN is service-dependent in such a manner that the MSRN comprises information on the service in addition to normal information. FIG. 5 shows one MSRN number structure according to the invention, which has a service code SERVN indicating the service of the call. In the example of FIG. 5, the SERVN is located after the routing address NDC. In the preferred embodiment of the invention, the NDC+SERVN provides a service-dependent routing address, that is, each NDC+SERVN is linked to a specific routing alternative. The number of different service codes SERVN is usually low, but at least equal to the number of different routing alternatives. Different services using the same routing alternative may have the same SERVN. Therefore a length of one or two digits is generally sufficient for SERVN.

The MSRN according to the invention is therefore slightly longer than a corresponding MSRN according to prior art. In GSM messages, the MSRN fields are arranged to receive a number according to E.164, that is, as many as 15 digits. An ordinary MSRN is generally shorter than this, for which reason the MSRN of the invention, which is 1 to 2 digits longer, can be transferred in current GSM messages.

In the preferred embodiment of the invention, the NDC+SERVN provide for the GMSC or another routing exchange a normal routing address to which normal digit analyses and routing mechanisms are applied. Each combination of NDC+SERVN is linked to a different transmission route in a routing exchange to which different transmission routes are connected. The exchange routes the call forwards via the transmission route which the combination NDC+SERVN in the roaming number refers to. The MSC has in a sense a different routing address for different transmission routes and services. The advantage of this embodiment is in that the invention does not require any extra mobile communication-specific functions for exchanges (in the ISDN or PSTN).

Alternatively, it is also possible that the exchange analyzes the service information of the MSRN and on the basis of it, selects the appropriate routing alternative, that is, the transmission resources that support the bearer services required by the call. This special function has to be introduced into the exchange.

Figure 3:
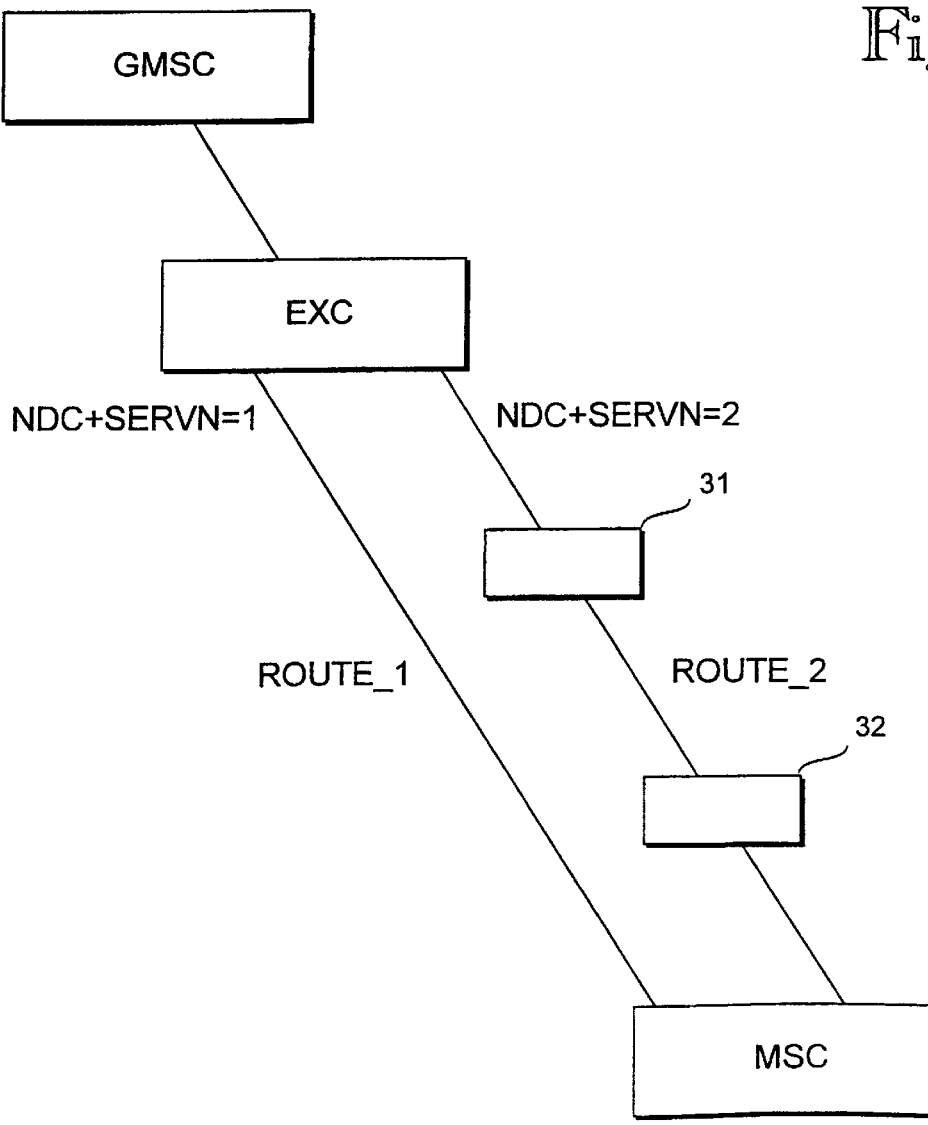
FIG. 3 shows a mobile communication system with different types of transmission links between the gateway mobile switching centre GMSC and the target exchange MSC.

In the following, the invention is illustrated by using as an example a situation of FIG. 3 where there may be different types of transmission links via which routing can be carried out between the GMSC and the MSC. Between the GMSC and any transit exchange EXC there is one transmission route which supports all the services. Neither in that case is any selection required in the GMSC. There are two transmission routes from the EXC to the MSC: ROUTE_1 and ROUTE_2. Route 2 comprises two transmission devices 31 and 32 which make this route unsuitable for some services. In this example, the transmitters 31 and 32 may support a compressed speech transmission on route 2, that is, at a lower speech coding rate, e.g. 13 kbit/s in the GSM system. This results in an increased capacity of transmission route 2 as a higher number of speech calls can be transferred via route 2 as compared with the transmission of each call at a normal transmission rate, 64 kbit/s. In practice, this results in that a lower number of transmission channels or transmission channels with a lower capacity are needed, which, in turn, results in lower transmission costs. This is a significant advantage especially when transmission distances are long.

Because of speech compression, route 2 is only suited for speech services. Route 1 is, however, capable of transferring calls using other services. In that case, two SERVNs are needed: SERVN=2 for speech services for routing them over route 2 and SERV=1 for other services for routing them over route 1.

In the EXC the combination VLRN+SERVN=1 is an MSC routing address which is linked to route 1. The combination VLRN+SERVN=2 is an MSC routing address which is linked to route 2.

In the following, routing of a mobile-terminating call will be examined. It is assumed that a PSTN subscriber makes a call to a directory number MSISDN allocated to a mobile subscriber's speech service. The call is transmitted from the PSTN to the GMSC that sends a routing information inquiry to the subscriber's HLR, which is determined by the subscriber's MSISDN. The subscriber's MSISDN is also sent in the routing information inquiry. The HLR retrieves the subscriber's IMSI and the GSM BCIE on the basis of the MSISDN. Then the HLR sends a roaming number request to the VLR containing the subscriber's IMSI and the bearer service information element BCIE corresponding to the basic service. The VLR analyzes the GSM BCIE which, as it is related to the speech service, allocates to the call a roaming number MSRN where SERVN=2. The VLR sends the allocated roaming number MSRN to the HLR in a response message. The HLR, in turn, forwards the roaming number MSRN to the GMSC in a message 6. The GMSC routes the call forwards to the exchange EXC. The EXC analyzes the MSRN and routes the call on the basis of the call routing address NDC+SERVN=2 to the MSC via route 2.

The figures and the specification related thereto are only intended to illustrate the present invention. In its details, the invention may vary within the scope of the appended claims.

What is claimed is:

1. A visitor location register (VLR) for a mobile communication system, the visitor location register being arranged to, as a response to a roaming number request received from a home location register (HLR), allocate a roaming number to a call terminating at a mobile station (MS) within an area of a mobile switching centre associated with the visitor location register, and to send the allocated roaming number via the home location register (HLR) to a routing exchange (GMSC, EXC) to be used for routing the call to said mobile switching centre (MSC), characterized in that the allocated roaming number (MSRN) contains a part (SERVN) which is dependent on the service required by the call and the value of which indicates of two or more different transmission routes (ROUTE$_{13}$ 1, ROUTE$_{13}$ 2) the one via which the call is to be routed to said mobile switching centre (MSC).

2. A visitor location register according to claim 1, characterized in that the roaming number (MSRN) comprises a country code (CC), a national destination code (NDC), a temporary subscriber number (SN) and a service-dependent code (SERVN), which along with the national destination code provides a routing address for selecting one of the alternative transmission routes.

3. A visitor location register according to claim 1, characterized in that the service-dependent part (SERVN) of the roaming number indicates the service or the service resources required by the call.

4. A mobile communication system comprising a mobile switching centre (MSC), a visitor location register (VLR) associated with said mobile switching centre, a home location register (HLR), a gateway mobile switching centre (GMSC) and a transmission system comprising at least two different alternative transmission routes (ROUTE$_{13}$ 1, ROUTE$_{13}$ 2) between the mobile switching centre (MSC) and the gateway mobile switching centre (GMSC), and that the gateway mobile switching centre (GMSC) is arranged to make a database inquiry into the home location register (HLR) upon receiving a terminating call to a mobile subscriber's directory number, the home location register (HLR) is arranged to request the roaming number (MSRN) of the visitor location register (VLR) within which the mobile subscriber is located, and indicate in the request the services determined by the directory number, the visitor location register (VLR) is arranged to allocate a roaming number (MSRN) to the call and send it as a response to the home location register, the home location register (HLR) is arranged to send the roaming number to the gateway mobile switching centre, the gateway mobile switching centre (GMSC) is arranged to route the call on the basis of the routing information contained in the roaming number to the mobile switching centre (MSC), characterized in that the allocated roaming number contains a part (SERVN) which is dependent on the service required by the call and indicates of two or more different transmission routes (ROUTE$_{13}$ 1, ROUTE$_{13}$ 2) the one via which the call is to be routed from the GMSC to the mobile switching centre.

5. A system according to claim 4, characterized in that the roaming number comprises a country code (CC), a national destination code (NDC), a temporary subscriber number (SN) and a service-dependent code (SERVN) which along with the national destination code provides a routing address for selecting one of the alternative transmission routes.

6. A system according to claim 4, characterized in that the service-dependent part (SERVN) of the roaming number indicates the service or the service resources required by the call, and that the exchange (EXC,GMSC), to which the alternative transmission routes (ROUTE$_{13}$ 1,ROUTE$_{13}$ 2) are connected, is arranged to analyze the service-dependent part of the roaming number, determine on the basis of the analysis the service or the transfer resource required by the call and select a transmission route supporting the determined service or transmission resource from among the alternative transmission routes.

7. A system according to claim 5, characterized in that one (ROUTE$_{13}$ 2) of the alternative transmission routes comprises transmission devices (31, 32) for the transmission of compressed speech between the routing exchange (GMSC, EXC) and the mobile switching centre (MSC) in a speech service call, and that the other of the alternative transmission route (ROUTE__1) is arranged to support data transmission between the routing exchange and the mobile switching centre in data services.

8. A method for routing a mobile-terminating call in a mobile communication system comprising a mobile switching centre, a visitor location register associated with the mobile switching centre, a home location register, a gateway mobile switching centre and a transmission system comprising at least two different alternative transmission routes between the mobile switching centre and the gateway mobile switching centre, the method comprising the steps of receiving at the gateway mobile switching centre a mobile-terminating call addressed to a mobile subscriber's directory number, making a database inquiry from the gateway mobile switching centre to the home location register, sending a roaming number request from the home location register to the visitor location register within which the mobile subscriber is located, and indicating in the request the services of the call defined by the directory number, allocating a roaming number to the call in the visitor location register and sending it as a response to the home location register, sending a roaming number from the home location register to the gateway mobile switching centre, routing the call on the basis of routing information contained in the roaming number from the gateway mobile switching centre to the mobile switching centre, characterized by allocating a roaming number dependent on the service required by the call in the visitor location register, routing the call from the gateway mobile switching centre to the mobile switching centre via one of said alternative transmission routes selected according to the service-dependent roaming number.

9. A method according to claim 8, characterized by allocating in the visitor location register a roaming number comprising a country code CC, a national destination code (NDC), a temporary subscriber number (SN) and a service-dependent code (SERVN), which along with the national destination code provides a routing address for selecting one of said alternative transmission routes, routing the call from the exchange, to which the alternative transmission routes are connected, to the mobile switching centre via the one of the transmission routes whose routing address matches with a combination of the national destination code and the service-dependent code in the roaming number.

10. A system according to claim 5, characterized in that the service-dependent part (SERVN) of the roaming number indicates the service or the service resources required by the call, and that the exchange (EXC, GMSC), to which the alternative transmission routes (ROUTE_1, ROUTE_2) are connected, is arranged to analyze the service-dependent part of the roaming number, determine on the basis of the analysis the service of the transfer resource required by the call and select a transmission route supporting the determined service or transmission resource from among the alternative transmission routes.

11. A system according to claim 6, characterized in the one (ROUTE_2) of the alternative transmission routes comprises transmission devices (31,32) for the transmission of compressed speech between the routing exchange (GMSC, EXC) and the mobile switching centre (MSC) in a speech service call, and that the other of the alternative transmission route (ROUTE_1) is arranged to support data transmission between the routing exchange and the mobile switching centre in data services.

12. A system according to claim 9, characterized in the one (ROUTE_2) of the alternative transmission routes comprises transmission devices (31,32) for the transmission of compressed speech between the routing exchange (GMSC, EXC) and the mobile switching centre (MSC) in a speech service call, and that the other of the alternative transmission route (ROUTE_1) is arranged to support data transmission between the routing exchange and the mobile switching centre in data services.

* * * * *